US006269193B1

(12) United States Patent
Young et al.

(10) Patent No.: US 6,269,193 B1
(45) Date of Patent: Jul. 31, 2001

(54) METHOD FOR STATISTICALLY LOSSLESS COMPRESSION OF DIGITAL PROJECTION RADIOGRAPHIC IMAGES

(75) Inventors: Susan S. Young, Buffalo, NY (US); Bruce R. Whiting, Wildwood, MO (US); David H. Foos, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/218,123

(22) Filed: Dec. 21, 1998

(51) Int. Cl.[7] .................................................. G06K 9/46
(52) U.S. Cl. ............................................ 382/244; 382/251
(58) Field of Search ......................................... 382/232, 233, 382/234, 235, 236, 237, 238, 239, 240, 241, 242, 243, 244, 245, 260, 250, 264, 268, 171, 172, 270, 271, 298, 299, 128, 133, 132, 275, 276, 283; 348/432, 433; 358/432, 433, 429, 262

(56) References Cited

U.S. PATENT DOCUMENTS

| 5,204,756 | | 4/1993 | Chevion et al. . | |
|---|---|---|---|---|
| 5,432,870 | * | 7/1995 | Schwartz | 382/232 |
| 5,539,842 | * | 7/1996 | Schwartz | 382/232 |
| 5,552,898 | | 9/1996 | Deschuytere . | |
| 5,553,160 | | 9/1996 | Dawson . | |
| 5,633,511 | | 5/1997 | Lee et al. . | |
| 5,729,631 | * | 3/1998 | Wober et al. | 382/232 |
| 5,896,463 | * | 4/1999 | Kuhn | 382/133 |
| 5,982,916 | * | 11/1999 | Kuhn | 382/132 |

* cited by examiner

*Primary Examiner*—Phuoc Tran
*Assistant Examiner*—Amir Alavi
(74) *Attorney, Agent, or Firm*—William F. Noval (57) ABSTRACT

A method of automatically compressing and decompressing a digital image that is comprised of the following steps: acquiring a digital image through an image acquisition system; generating a look-up-table (companding function) based upon noise characteristics of the image acquisition system; applying the companding function to the image; processing the image using a lossless compression algorithm; reconstructing the image using the associated decompression algorithm; and applying the inverse of the companding function to the image.

8 Claims, 5 Drawing Sheets

METHOD FOR STATISTICALLY LOSSLESS COMPRESSION OF DIGITAL PROJECTION RADIOGRAPHIC IMAGES

FIELD OF THE INVENTION

This invention relates in general to digital medical imaging, and in particular to the compression of projection radiographic images that have been digitally acquired.

BACKGROUND OF THE INVENTION

Image compression is essential to the successful deployment of digital medical imaging systems, also referred to as Picture Archive and Communications Systems (PACS). Image compression is a processing operation that reduces the amount of digital data required to represent an image, and hence, enables more efficient utilization of both available network bandwidth and image archive storage space, thereby reducing the cost to implement PACS. There are fundamentally two types of image compression. The first type is known as lossless compression. With lossless compression the reconstructed image identically matches the original and is therefore a fully reversible process. Since the diagnostic quality of the compressed and reconstructed image is assured relative to the original image, lossless compression is appealing for medical applications. The major drawback of lossless compression is the limited compression ratios that can be achieved, which is typically on the order of 2:1, or equivalently a 50% reduction in file size. Lossy methods can achieve much greater compression ratios, on the order of 10:1 or higher, and can therefore provide more significant cost savings for PACS implementations. However the medical community has been slow to accept lossy compression for fear that important diagnostic information could be lost. It is therefore necessary to provide a means of achieving higher compression ratios than those achievable with lossless methods but in a manner that will be widely acceptable to the medical imaging community. Such a method would provide reasonable cost savings for PACS and minimize the potential for loss of important diagnostic information.

Reid et al, "Second-generation image coding: an overview," ACM Computing Surveys, Vol. 29, No. 1, pp. 2–29, March 1997, in overviewed recently-developed image compression techniques that have been termed second-generation image coding. These methods incorporate properties of the human visual system into the coding strategy in order to achieve high compression ratios while maintaining acceptable image quality. The techniques utilized in second-generation image coding are based on visual patterns, multi-scale decomposition, contour-coding, and segmentation. Visual-pattern based approaches use the fact that the eye can decompose the overall image into a set of smaller "visual patterns". Multi-scale decomposition techniques create sets of progressively smaller images and identify common features in the image that are present at the various levels of detail. All second-generation coding techniques are lossy in nature. However, these methods attempt to identify and separate visually significant and visually insignificant areas of the image, and apply appropriate coding techniques to each area.

Researchers in W. C. Chang, et al, "Lossless image compression methods for PET imaging," Biomedical Engineering-Applications, Basis & Communications, Vol. 8, No. 3, pp. 309–316, June 1996; L. Shen et al., "Segmentation-based lossless coding of medical images," Proceedings of the SPIE-The International Society for Optical Engineering Conference, 24–26 May 1995, Taipei, Taiwan, SPIE, Vol. 2501, pp. 974–982; and V. Vlahakis et al., "ROI approach to wavelet-based, hybrid compression of MR images," Proceedings of 6$^{th}$ International Conference on Image Processing and its Applications, 14–17 Jul. 1997, Dublin, Ireland, Part Vol. 2, pp. 833–837 proposed segmentation-based hybrid lossless image compression coding methods for medical images. W. C. Chang et al, "Lossless image compression methods for PET imaging," Biomedical Engineering-Applications, Basis & Communications, Vol. 8, No. 3, pp. 309–316, June 1996, described a hybrid lossless coding method for PET (Positron Emission Tomography) images. The supported region (cross-section region) and unsupported region (background region) was separated by a binary mask using a thresholding segmentation algorithm. The unsupported region was not encoded while the supported region was encoded using a lossless entropy coding method. However, the boundary of the binary mask, which is the contour of the segmented supported region, had to be encoded using the chain code method. Extra bytes for describing the shape of the contour also needed to be provided to both encoder and decoder in order to reconstruct the image.

Another segmentation-based lossless coding method was applied to digitized mammography and chest radiography film images in L. Shen et al., "Segmentation-based lossless coding of medical images," Proceedings of the SPIE—The International Society for Optical Engineering Conference, 24–26 May 1995, Taipei, Taiwan, SPIE Vol. 2501, pp. 974–982. The region growing scheme was used to generate segments at which gradients of gray levels were within certain thresholds. The discontinuity index map data sets were also generated to present the pixels which separated segments. An entropy coding method was applied to code segments individually. However, it was necessary to send extra data with the compressed image to correctly index the segments for decompression.

One region of interest (ROI) approach to a wavelet-based hybrid compression method for magnetic resonance (MR) images was proposed in V. Vlahakis, et al., "ROI approach to wavelet-based, hybrid compression of MR images," Proceedings of 6$^{th}$ International Conference on Image Processing and its Applications, 14–17 July 1997, Dublin, Ireland, Part Vol. 2, pp. 833–837. A MR image was decomposed using a wavelet transform into three scales. Starting at the middle scale, scale 2, the radiologist clicked the mouse at a seed pixel inside the area which he identified as the ROI (corresponding to brain tissue, tumors, etc.), and a seed-fill segmentation algorithm scanned and labeled the pixels around it until a boundary was detected. Then fine or no quantization was used for wavelet coefficients corresponding to ROI, and coarse quantization for the rest of the coefficients of scale 1 and 2. Finally, the quantized coefficients were run-length coded and the resulting run-lengths were compressed with a Huffman code. The low-pass residue of scale 3 was losslessly compressed using DPCM (Differential Pulse Code Modulation).

Other hybrid lossy and lossless compression methods for consumer images are disclosed in the following U.S. patents. U.S. Pat. No. 5,552,898, issued Sep. 3, 1996, to inventor F. A. Deschuytere teaches a method of lossy and lossless compression in a raster image processor on output devices. Digital input commands defined in a page description language are separated into two types of instructions. The first set of instructions comprise solid regions on the printed output, which are filled with recorder elements (e.g., ink) of the same highest or lowest density value, and second instructions resulting in halftoned regions, which are getting different densities. It is advantageous to distinguish a first type of instructions from a second type of instructions, and treat them separately. The information stored in the first type of instructions is compressed by a lossless compression method (recommended by CCITT—International Telegraph and Telephone Consultative Committee). As such, solid patterns will appear on the rasterized image at the highest resolution and without any quality loss. The second type of instructions on the other hand corresponds to continuous tone image or intermediate tone graphical information. A slight deterioration of the information contents is acceptable and will be hardly noticeable, thus is compressed by a lossy compression method (JPEG). When all the digital input commands for one page are handled, the compressed data can be retrieved and combined to reconstruct the rasterized image.

U.S. Pat. No. 5,553,160, issued Sep. 3, 1996, to inventor B. J. Dawson teaches a method and apparatus for dynamically selecting an image compression process based on image size and color resolution to be transferred from a first agent to a second agent. For example, if the image size is less than 4K bytes, the image remains uncompressed. If the image size is greater than 4K bytes and color resolution is less than 8 bits, the image is compressed using a lossless compression process. If the image size is greater than 4K bytes and color resolution is greater that 8 bits, then the lossless process is run on a predetermined portion of the image. This predetermined portion could be the first 10K bytes, the last 10K bytes or the middle 10K bytes in the image. After running the lossless process in this step, if the compression ratio for the predetermined portion is greater than or equal to 5:1, then a lossy process is used for compression, otherwise a couple of more decisions are made where lossless or lossy compression method is used.

Another method treats binary text images using lossy and lossless compression to achieve high compression ratio is disclosed in U.S. Pat. No. 5,204,756, issued Apr. 20, 1993, to inventors D. S. Chevion et al. The method uses variable compression ratios which depend on an evaluation of the nature of the binary image at hand, with lossy compression being limited to large low-frequency areas where quality deterioration is subjectively unnoticeable, and with small high-frequency areas being compressed losslessly.

The present invention differs from prior art in that reconstruction errors are introduced into the compression process in a controlled manner based on the inherent noise properties of the image acquisition system. The present invention discloses a method of statistically lossless compression based on the preservation of the image statistics in the local neighborhood around each image pixel. Prior art teaches image segmentation-based compression wherein images are adaptively quantized in order to minimize the perception of distortion based on psycho-visual criteria. The distortion introduced by the method disclosed in the present invention does not depend on any psycho-visual based rules or criteria. The present invention combines four steps to achieve virtually lossless compression. First, the image is segmented into two regions, the foreground and the region-of-interest (ROI). Second, the foreground region is replaced by a field of uniform code values (typically a black) so that this region has zero pixel modulation. Third, a look-up-table (LUT) is applied to the image data to reduce the number of bits per pixel required to represent the image without introducing quantization into the image. This step is known as companding. The companding function is derived from the inherent noise properties of the image acquisition system using a theory which describes the modification of statistical moments in images due to quantization. Finally, the image is compressed using a new standard for lossless image compression known as JPEG-LS (ISO/IED JTC 1/SC 29/WG 1 FCD 14495—public draft, FCD 14495, Lossless and near-lossless coding of continuous tone still images (JPEG-LS)). In addition to the standard lossless mode of compression, JPEG-LS also allows the user to trade constrained reconstruction errors for increased amounts of compression. The companding step may be substituted, albeit at the expense of some loss in compression efficiency, in favor of the reconstruction error tolerance approach to maintain compliance with the JPEG-LS standard. Either method can be implemented to satisfy the statistically lossless criterion.

The following are representative of the prior art.

U.S. Pat. No. 5,552,898, September 1996, F. A. Deschuytere, "Lossy and Lossless compression in raster image processor."

U.S. Pat. No. 5,553,160, September 1996, B. J. Dawson, Method and apparatus for dynamically selecting an image compression process based on image size and color resolution."

U.S. Pat. No. 5,204,756, April 1993, D. S. Chevion, E. D. Karnin and E. Walach, "Method for high-quality compression of binary text images."

U.S. Pat. No. 5,633,511, May 1997, H. C. Lee, L. L. Lori and R. A. Senn, "Automatic tone scale adjustment using image activity measures."

SUMMARY OF THE INVENTION

According to the present invention, there is provided a solution to the problems of the prior art. The present invention allows for the statistically lossless compression of digital projection radiographs. The method makes use of a segmentation process that separates the foreground regions, resulting from collimation blade masking, of a digital projection radiograph from the anatomical region-of-interest. The segmentation process is followed by the substitution of the code values associated with the foreground region with a uniform value so that the foreground region has zero modulation. The segmentation process is followed by the application of a look-up-table, i.e., companding function, that is derived from the noise properties of the imaging acquisition system. Finally, the companded image is processed with the new lossless image compression algorithm standard known as JPEG-LS. One form of the method may be implemented in a manner that is conformant with the JPEG-LS standard,

ADVANTAGEOUS EFFECT OF THE INVENTION

The invention has the following advantages.

1. This invention describes a new method of image compression that provides significantly improved compression efficiency over lossless entropy coding techniques. This new method introduces errors in a more controlled and predictable fashion from the way that errors are introduced by standard lossy image compression methods such as in block DCT-based JPEG and wavelet-based methods. The predictable nature of the compression distortion may facilitate the acceptance of lossy compression methods by the medical imaging community.

2. This method is appropriate for medical imaging applications because it can provide modest levels of compression by introducing some error into the image, but provides a theoretical basis supporting the assertion that the information content contained in the compressed and reconstructed version is unchanged from the original.

3. This method achieves compression ratios that are approximately three times greater than the compression ratios achievable by standard lossless methods.

4. One form of the method can be implemented in a way that is conformant with the JPEG-LS standard, thereby allowing the compressed image to be decompressed by any vendor's JPEG-LS conformant implementation of the decompressor.

5. The degree of compression is not subject to psycho-visually based criteria and rules since the compression distortion is based on the inherent noise properties of the image acquisition system.

DETAILED DESCRIPTION OF THE INVENTION

The present invention discloses a statistically-based method for compression of digital projection radiographic images that is based on the combination of four image processing steps.

A radiation field segmentation algorithm is used first to separate the anatomical regions-of-interest from the foreground region. Second, the code values in the foreground region are replaced with a uniform value so that there is zero pixel modulation in this region. Third, the image is processed through a look-up-table (companding function) which is derived based on the inherent noise characteristics of the image acquisition system. Fourth, the companded image is compressed using the JPEG-LS algorithm operated in the lossless mode. The use of the reconstruction error tolerance mode that is available in the JPEG-LS algorithm may be substituted for the companding step.

Figure 8:
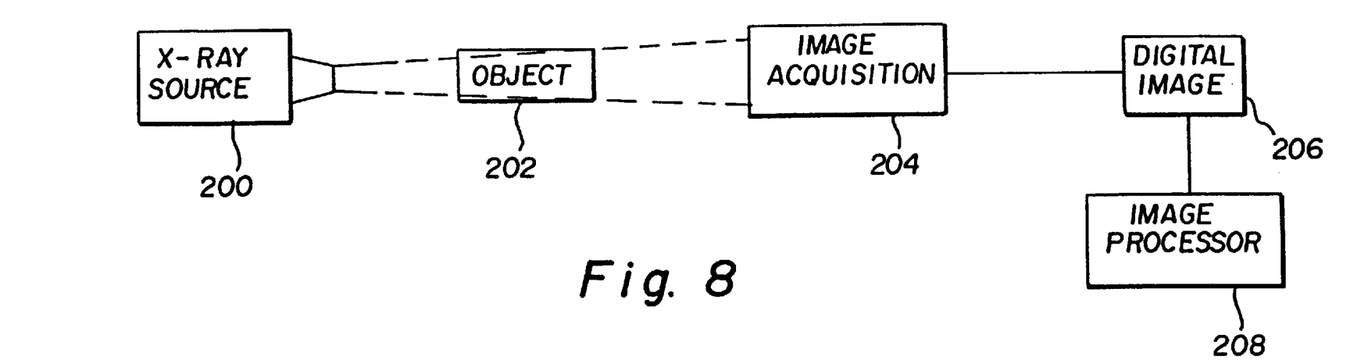
FIG. 8 is a block diagram of a digital image acquisition system.

The method of the present invention is described as a series of operations performed on a digital image, such as a digital radiographic image of a body part. The digital image can be formed by the digital image acquisition system of FIG. 8. As shown, x-ray source 200 projects x-rays through object 202 (such as a body part extremity, e.g., hand or foot) to image acquisition system 204. The image acquisition system can be, for example, (1) a standard x-ray screen/film combination which produces an x-ray film image which is processed chemically or thermally and the processed film digitized by a scanner/digitizer 206; (2) a computed radiography system where a latent x-ray image is formed in a storage phosphor 204 and a corresponding digital image is produced by reading out the storage phosphor by a CR reader 206; (3) a diagnostic scanner (such as MRI, CT, US, PET) produces an electronic x-ray image which is digitized; and (4) a direct digital acquisition system typically consisting of a phosphor based scintillating screen coupled to an imager (CCD, MOS) through a lens or fiber optic system.

Figure 9:
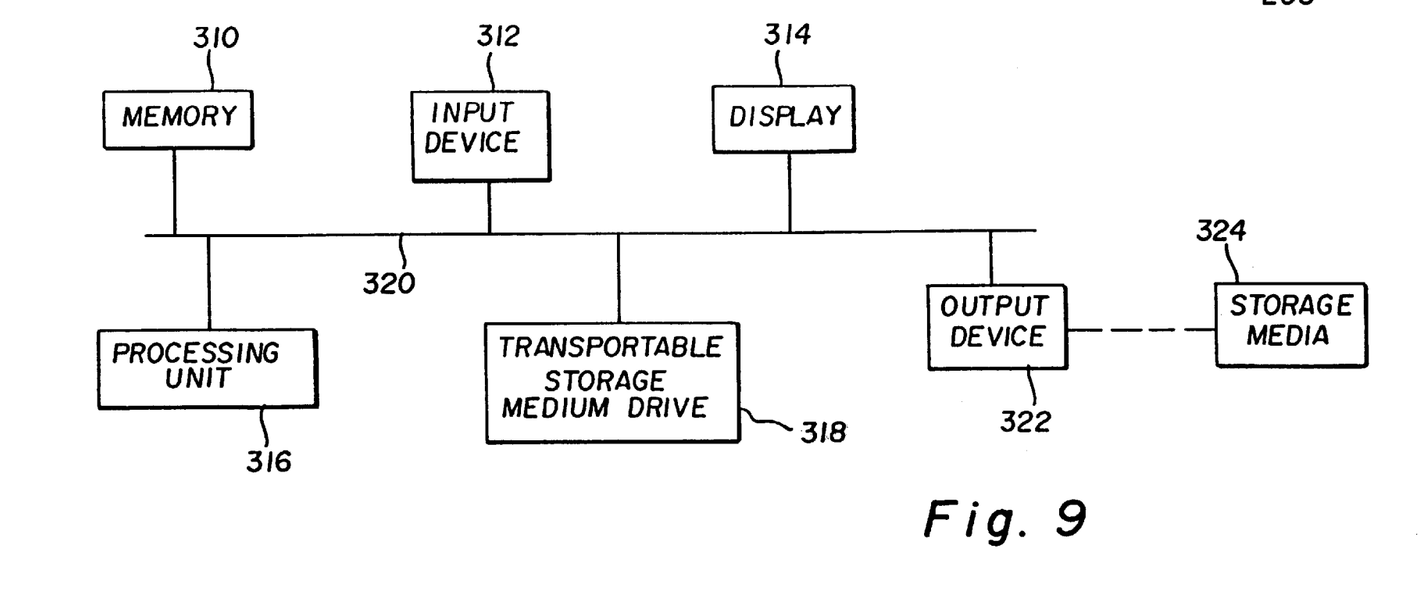
FIG. 9 is a block diagram of a digital image processor for carrying out the method of the present invention.

The digital image is processed in image processor 208, according to the method of the present invention. Image processor 208 can take the form of a digital computer, such as illustrated in FIG. 9. In such case, one or more of the steps of said method can be carried out using software routines. Image processor 208 can also include hardware or firmware for carrying out one or more of said method steps. Thus, the steps of the method of the invention can be carried out using software, firmware, and hardware, either alone or in any preferable combination.

As shown in FIG. 9, a digital computer 300 includes a memory 310 for storing digital images, application programs, operating system, etc. Memory 310 can include mass memory (such as a hard magnetic disc or CD ROM), and fast memory (such as RAM). Computer 300 also includes input device 312 (such as a keyboard, mouse, touch screen), display 314 (CRT monitor, LCD), central processing unit 316 (microprocessor), output device 318 (thermal printer, dot matrix printer, laser printer, ink jet printer). Components 310,312,314,316,318 are connected together by control/data bus 320. Computer 300 can include a transportable storage medium drive 322 for reading from and/or writing to transportable storage media 324, such as a floppy magnetic disk or writeable optical compact disk (CD).

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

These components are described in detail in the following.

Figure 1:
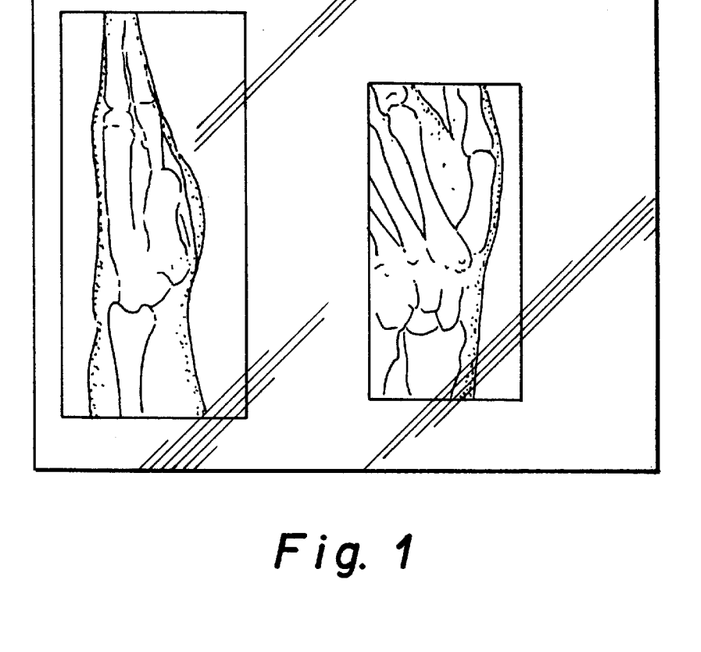
FIG. 1 shows an example of foreground segmentation, followed by setting the foreground code values to a uniform value.

A method to separate the radiation fields from the foreground was developed for digital radiographic imaging systems in X. Wang, et al, "Method for recognizing multiple radiation fields in computed radiography," Proceedings of the SPIE—The International Society for Optical Engineering Conference, 20–26 Feb. 1999, San Diego, Calif. U.S.A., SPIE Vol. 3661–176. The first step in the statistically lossless compression process is to separate the radiation fields from the foreground and the second step sets a uniform value to the foreground. FIG. 1 shows an example of the effect of foreground segmentation and replacement of the foreground code values with a uniform value.

The third step in the compression process is to quantize the pixel values in the image in such a way that the local pixel statistics in the image are preserved. The approach utilizes the noise characteristics that are inherent in the imaging system. The noise characteristics of a digital radiographic imaging system can be represented by a signal dependent random noise model. For example, the following describes the noise characteristics of a storage phosphor based computed radiographic imaging system, where $\sigma$ is the standard deviation of the code values, Q is the x-ray exposure, and a is a constant.

$$\sigma = \log\left(\frac{1}{a\sqrt{Q}} + 1\right) * 1000$$

For a log exposure based digital system, exposure Q can be related to the code values in the digital image by the following equation.

$$code_{13}value = \log(Q) * 1000 + bias$$

Figure 2:
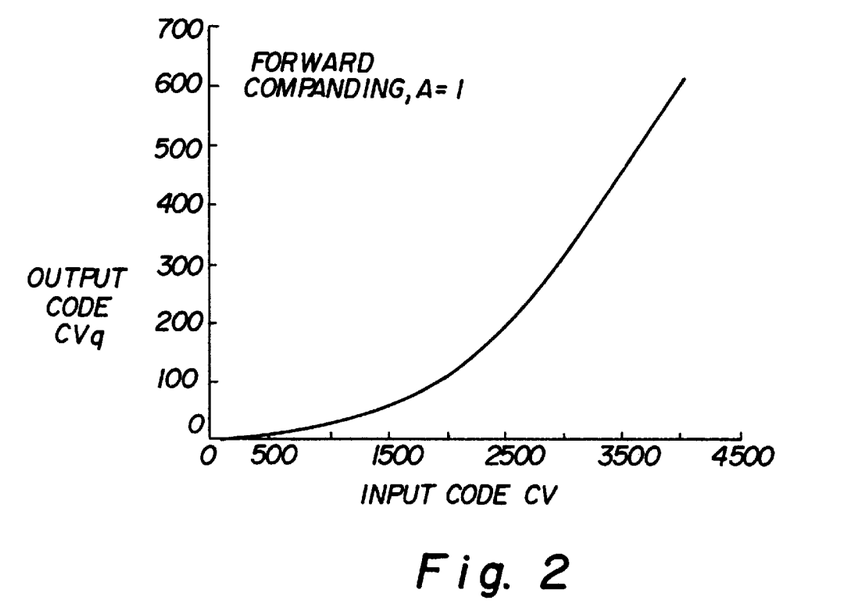
FIG. 2 shows the theoretically derived forward companding function corresponding to the acquisition noise characteristics for a computed radiographic acquisition system. The companding function maps the input code values of the original image to a fewer number of allowed levels. The quantization introduced by the companding function corresponds to the code value dependent noise threshold, above which the statistical properties of the image undergo rapid change.
Figure 3:
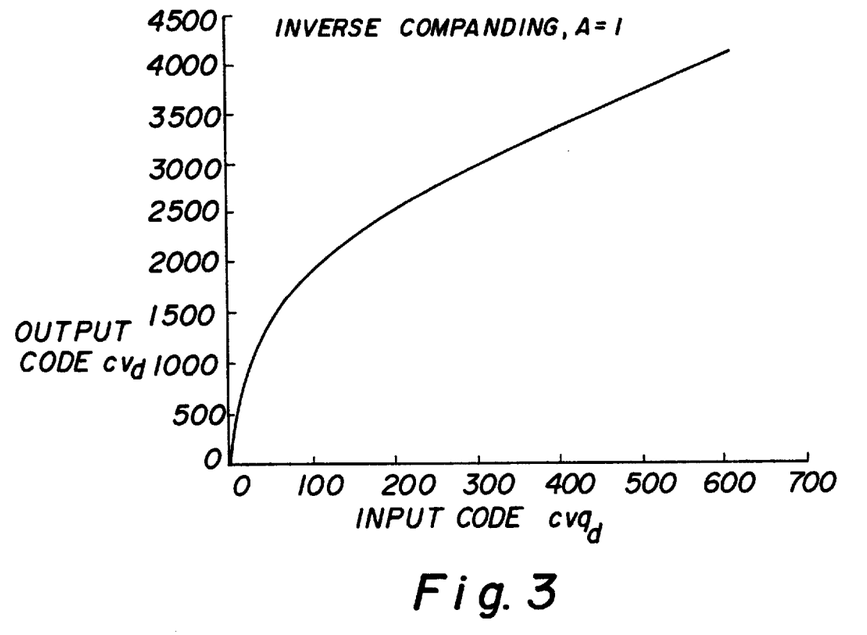
FIG. 3 shows the inverse companding function.
Figure 4:
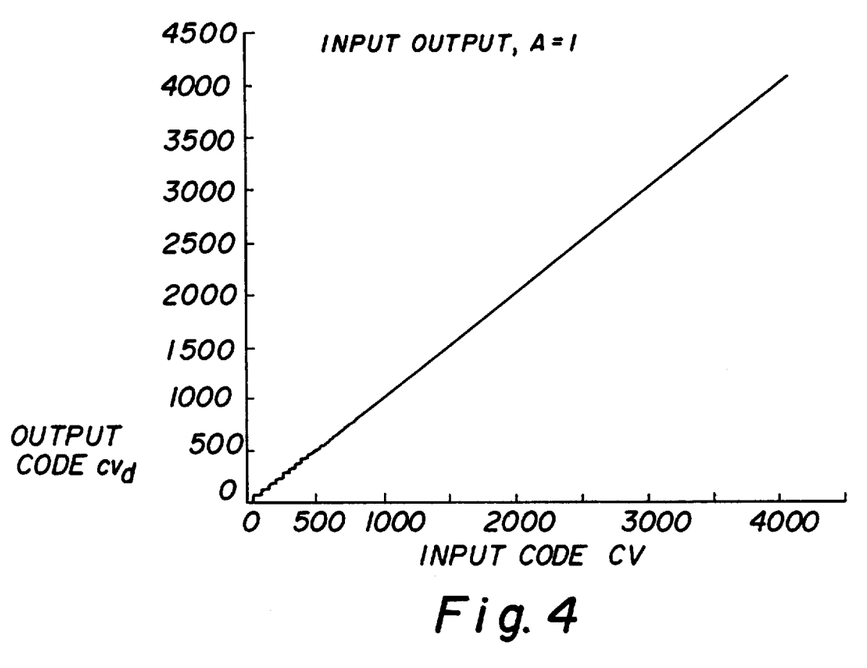
FIG. 4 shows the quantized effect by forward and inverse companding. In the lower code value range (low density regions on the film), the quantization steps are coarse. In the higher code value range (high density regions on the film), the quantization steps are fine.
Figure 5:
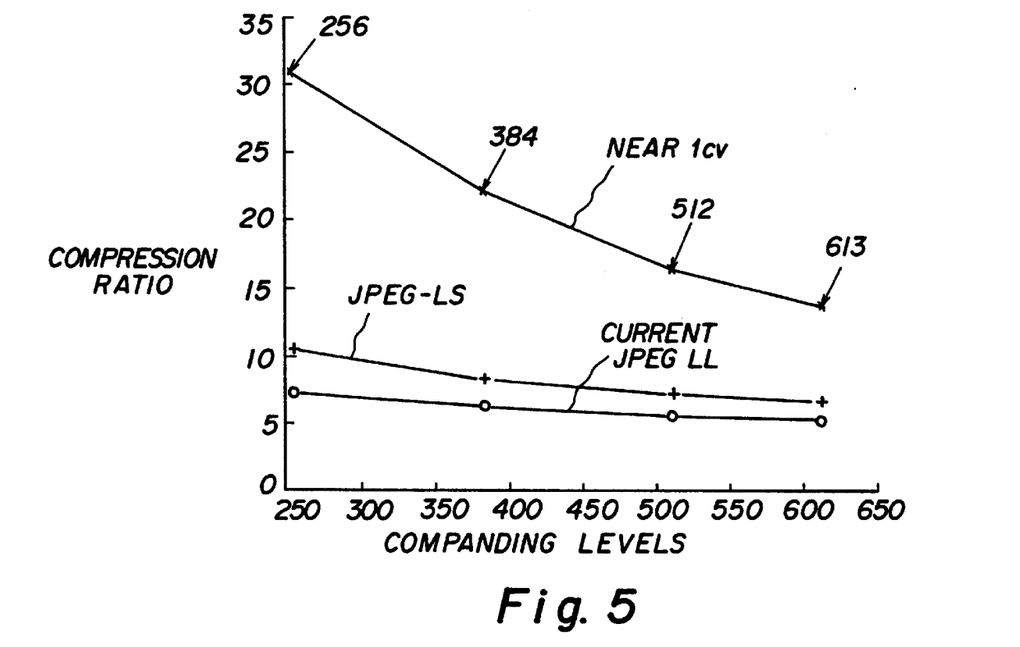
FIG. 5 shows the relationship between different companding functions and compression ratio. For the computed radiography example that is shown, companding functions which map the 12 bit/pixel input image to less than 613 output levels will introduce potentially visible quantization or contouring effects into the image.
Figure 6:
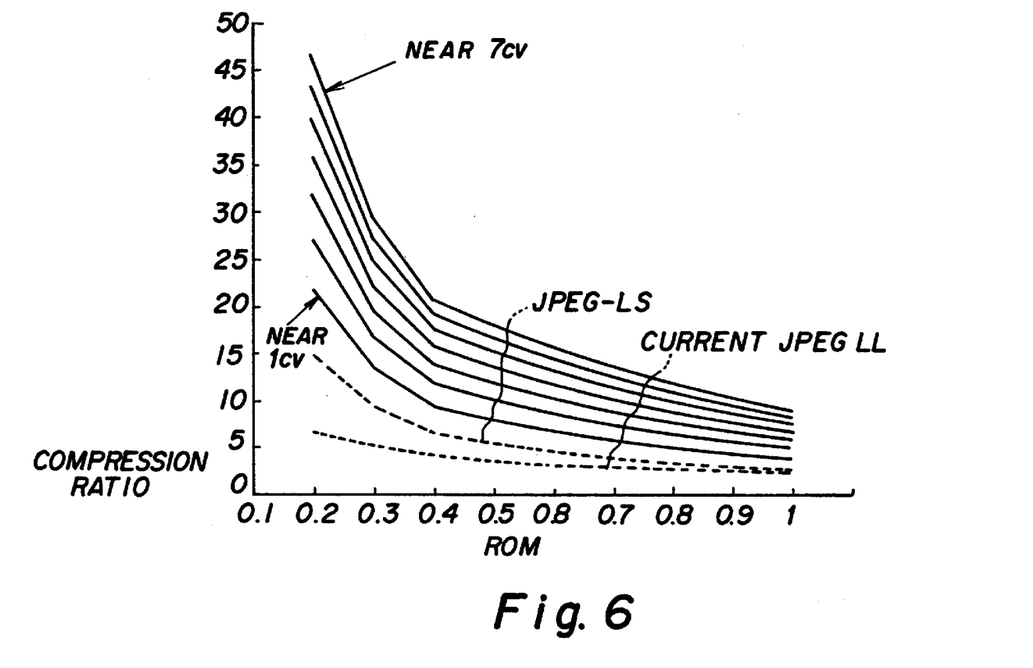
FIG. 6 shows how compression ratio increases as the percentage of the image that is segmented as region-of-interest (ROI) decreases when compressing the image (I) using JPEG-LS. Also shown is relative insensitivity of the compression ratio to changes in ROI/I when compressing the image with the Baseline JPEG Lossless algorithm.

The noise, $\sigma$, may then be related to the code values in the image and the code value dependent noise characteristics of the system can be plotted (FIG. 1). FIG. 1 shows that the lower exposure levels contain higher system noise and the higher exposure levels have correspondingly lower system noise. B. R. Whiting, "Image quantization: statistics and modeling," Proceedings of the SPIE—The International Society for Optical Engineering Conference, 22–24 Feb. 1998, San Diego, Calif., USA, SPIE Vol. 3336-28, developed a code-value (exposure) dependent model for computed radiography systems that can be used to calculate the bit-depth required to represent the image in order that the local pixel statistics do not change. The model prescribes a look-up-table (LUT) or companding function that can be used to process the digital radiographic image from a higher bit-depth to a lower bit-depth without introducing visible quantization or contouring artifacts. The model prescribes quantization step sizes that will vary with code value, consistent with the signal dependent noise characteristics of the image acquisition system. FIG. 2 and FIG. 3 show examples of derived forward and reverse companding functions that can be used for the statistically lossless compression process for a computed radiography system. FIG. 4 shows the quantization step sizes as a function of code value. It is evident from FIG. 4 that larger quantization step sizes can be tolerated at the lower exposure levels where the system noise is greater. Similarly finer quantization step sizes are required to represent the higher exposure levels of the image which have lower system noise.

Recently, the JPEG committee standardized a new lossless compression algorithm called JPEG-LS (or sometimes LOCO-I, from its historical roots in a technique called LOw Complexity LOssless COmpression for Images [M.J. Weinberger, et al., "LOCO-I: A Low Complexity, Context-Based, Lossless Image Compression Algorithm" Data Compression Conference 1996, pp. 140–149]). A key feature of this new lossless technique is that it improves compression efficiency in uniform regions through the use of runlength coding. The JPEG-LS lossless compression scheme, with its runlength coding, is well-suited for compressing such segmented computed radiographic images as mentioned above. The more uniform background contained in the image, the higher the compression ratio can be achieved with JPEG-LS. Another advantage of JPEG-LS is the ability to provide near-lossless compression, that is, the maximum error in the reconstructed image can be constrained to +/− n code values (gray levels), where n can be selected by the user. The use of the reconstruction error tolerance can be substituted for the companding function, although there will be a loss in compression efficiency if attempting to maintain the statistically lossless criterion since the reconstruction tolerance cannot be specified as a function of code value.

Figure 7:
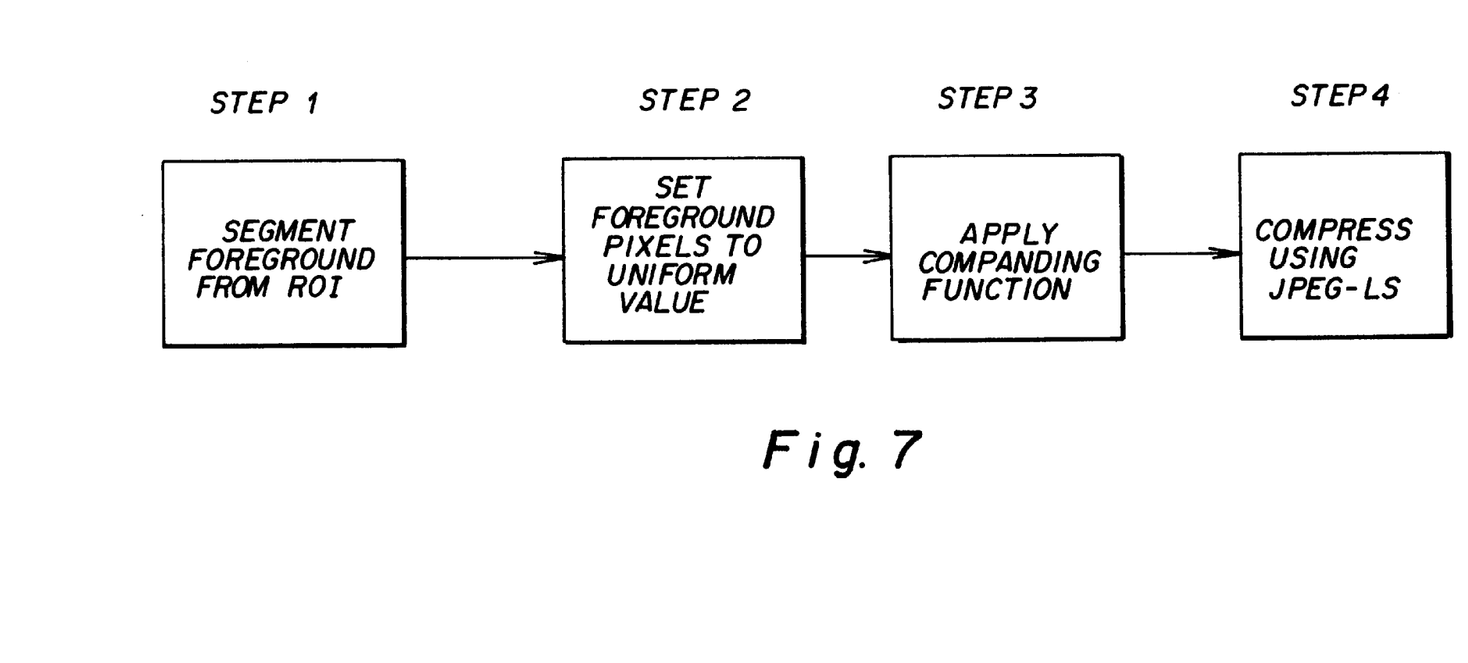
FIG. 7 shows a block diagram of the preferred embodiment of the statistically lossless image compression algorithm.

The image chain in this invention is shown in FIG. 7. The tone scale algorithm (U.S. Pat. No. 5,633,511) is run on the raw digital radiographic image data to generate the visually optimized tone scale look up table. However, the raw image data are not changed at this step. The radiation fields segmentation algorithm is then applied to raw digital radiographic image data at the second step. In this step, a uniform value is set in the foreground region.

Since the companding function is based on the noise model of the raw image data, that is, without any tone scale and edge enhancement, it is suitable to apply the companding function on a digital radiographic image after the segmentation. After this, a lossless compression algorithm is applied.

After this step, the image can be stored in an archive or transmitted to another agent. When the image needs to be retrieved, the inverse lossless compression algorithm is first applied. Then the inverse companding function is applied. The last two steps in the image chain involve applying the edge enhancement (unsharp masking) and the tone scale look up table (LUT) to the resultant image. After this step, the image is converted to film density for a photographic film or luminance for a CRT monitor.

The invention has been described in detail with particular reference to certain preferred embodiments thereof, but it will be understood that variations and modifications can be effected within the spirit and scope of the invention.

Parts List 200 x-ray source
202 object
204 image acquisition system
206 scanner/digitizer
208 image processor
300 digital computer
310 memory
312 input device
314 display
316 central processing unit
318 output device
320 control/data bus
322 transportable storage medium drive
324 transportable storage media

What is claimed is:

1. A method of automatically compressing and decompressing a digital image constituting a set of pixels with a pre-selected bit depth that is comprised of the following steps:

acquiring a digital image through an image acquisition system;

generating a look-up-table to reduce bit depth of said digital image pixels without introducing visible quantization or contouring artifacts based upon noise characteristics of the image acquisition system;

applying said look-up-table to said image;

processing said image using a lossless compression algorithm;

reconstructing said image using the associated de-compression algorithm; and applying the inverse of said look-up-table to said image.

2. The method of claim 1 wherein said lossless compression algorithm is the JPEG-LS algorithm operated in lossless mode.

3. A method of automatically compressing and decompressing a digital image that is comprised of the following steps:

acquiring a digital image constituting a set of pixels with a pre-selected bit depth through an image acquisition system;

generating a look-up-table to reduce the bit depth of said digital image pixels without introducing visible quantization or contouring artifacts based upon noise characteristics of the image acquisition system;

automatically segmenting said image into a foreground region and a region of interest;

setting the value of said foreground region to a constant value;

applying said look-up-table to said image;

processing said image using a lossless compression algorithm;

reconstructing said image using the associated de-compression algorithm; and applying the inverse of said look-up-table to said image.

4. The method of claim 3 wherein said lossless compression algorithm is the JPEG-LS algorithm operated in lossless mode.

5. A method of automatically compressing and decompressing a digital image that is that is comprised of the following steps:

acquiring a digital image constituting a set of pixels with a pre-selected bit depth through an image acquisition system;

generating a look-up-table to reduce the bit depth of said digital image pixels without introducing visible quantization or contouring artifacts based upon noise characteristics of the image acquisition system;

determining the minimum quantization level in said look-up-table;

processing said image using the JPEG-LS algorithm in near-lossless mode with the algorithm parameter 'n' set to said minimum quantization level; and reconstructing said image using the JPEG-LS de-compression algorithm.

6. A method of automatically compressing and decompressing a digital image that is that is comprised of the following steps:

acquiring a digital image constituting a set of pixels with a pre-selected bit depth through an image acquisition system;

generating a look-up-table to reduce the bit depth of said digital image pixels without introducing visible quantization or contouring artifacts based upon noise characteristics of the image acquisition system;

determining the minimum quantization level in said look-up-table;

automatically segmenting said image into a foreground region and a region of interest, setting the value of said foreground region to a constant value;

processing said image using the JPEG-LS algorithm in near-lossless mode with the algorithm parameter 'n' set to said minimum quantization level; and reconstructing said image using the JPEG-LS de-compression algorithm.

7. The method of claim 1 wherein said acquired digital image is a digital medical image.

8. The method of claim 1 wherein said digital medical image is a digital radiographic image.

* * * * *

UNITED STATES PATENT AND TRADEMARK OFFICE
CERTIFICATE OF CORRECTION

PATENT NO.    : 6,269,193 B1
DATED         : July 31, 2001
INVENTOR(S)   : Susan S. Young et al.

It is certified that error appears in the above-identified patent and that said Letters Patent is hereby corrected as shown below:

<u>Title page,</u>
Item [73], after "Eastman Kodak Company, Rochester, NY (US)" insert -- and Washington University, St. Louis, MO (US) --

Signed and Sealed this

First Day of October, 2002

*Attest:*

*Attesting Officer*

JAMES E. ROGAN
*Director of the United States Patent and Trademark Office*